United States Patent [19]

Blumentritt et al.

[11] Patent Number: 4,703,472

[45] Date of Patent: Oct. 27, 1987

[54] WAVELENGTH MULTI/DEMULTIPLEXER

[75] Inventors: Martin Blumentritt, Königsbronn; Alfred Reüle, Aalen; Reinhold Bittner, Mögglingen, all of Fed. Rep. of Germany

[73] Assignee: Carl-Zeiss-Stiftung, Heidenheim, Fed. Rep. of Germany

[21] Appl. No.: 839,343

[22] Filed: Mar. 13, 1986

[30] Foreign Application Priority Data

Mar. 14, 1985 [DE] Fed. Rep. of Germany ....... 3509132

[51] Int. Cl.⁴ .............................................. H04B 9/00
[52] U.S. Cl. .................................... 370/3; 350/96.19
[58] Field of Search ................ 370/1, 2, 3; 350/96.15, 350/96.18, 96.19, 96.20, 96.21

[56] References Cited

U.S. PATENT DOCUMENTS

| 4,111,524 | 9/1978 | Tomlinson, III | 350/96.19 |
| 4,367,011 | 1/1983 | Monaghan | 350/96.2 |
| 4,622,662 | 11/1986 | Laude et al. | 350/96.19 |

FOREIGN PATENT DOCUMENTS

| 67972 | 12/1982 | European Pat. Off. | 350/96.15 |
| 55-36809 | 3/1980 | Japan | 350/96.21 |

OTHER PUBLICATIONS

Comerford et al—Optical Fiber Coupler—IBM Tech Disclosure Bulletin, vol. 22, #7, Dec. 1979, pp. 2933, 2934.

Primary Examiner—Joseph A. Orsino, Jr.
Attorney, Agent, or Firm—Walter Ottesen

[57] ABSTRACT

A multi/demultiplexer is disclosed wherein the light-conducting fibers are cemented into a perforated plate made of a photolithographically etchable material, and their terminal faces are ground down and polished together with the surface of the perforated plate. To compensate for focusing differences, a plate of appropriately matched thickness is disposed between the transparent supporting block and the surface of the perforated plate.

13 Claims, 7 Drawing Figures

WAVELENGTH MULTI/DEMULTIPLEXER

FIELD OF THE INVENTION

The invention relates to a wavelength multi/demultiplexer which includes a transparent supporting block having a diffraction grating and at least one coupling face for connecting light-conducting fibers.

BACKGROUND OF THE INVENTION

Wavelength multiplexers and wavelength demultiplexers are used in fiber-optic communications to increase the transmission capacity. With them, the modulated radiation from a plurality of light sources of various wavelengths is simultaneously transmitted through one optical fiber. To join and separate the various wavelength channels with as little loss as possible, it is known to provide a multiplexer and a demultiplexer, which operate with either diffraction gratings or interference filters, at the beginning and end of the transmission segment. A particularly sturdy and compact design is attainable if the space between the diffraction grating or interference filters and the light-conducting fibers for delivering and carrying away the radiation comprises a compact supporting block of transparent material.

Such multiplexers or demultiplexers having diffraction gratings are known, for instance from European patent application Nos. 0 067 972 and 0 093 396. There, coupling faces are provided on the transparent supporting block, where the light-conducting fibers can be coupled in or cemented. It is readily appreciated that the light-conducting fibers must be placed very precisely on the coupling faces. For a coupling face to which many light-conducting fibers must be attached, this involves considerable effort for adjustment, and hence is very expensive.

SUMMARY OF THE INVENTION

It is an object of the invention to provide a multiplexer or demultiplexer in which a plurality of light-conducting fibers located close together can be attached simply and with the least possible effort in terms of adjustment operations.

This object is attained in accordance with the invention by providing that a plurality of light-conducting fibers is fixed in a perforated plate made of a material that can be etched by photolithographic means, that both the attachment faces of the light-conducting fibers and the surface of the perforated plate are machined in common, and that the perforated plate is attached to the coupling face.

The photolithographically etchable material may be etchable glass or silicon, for example. By exposure to light using a mask and by subsequent etching, it is simple to produce the bores for the light-conducting fibers with a very precise location with respect to one another. Once the light-conducting fibers are fixed in the bores, for example by being cemented, their end faces can be machined and polished along with the surface of the perforated plate. The surface thereby produced may be either plane or curved. The light-conducting fibers that have been fixed in the perforated plate then need to be adjusted only as an entity with respect to the other components of the multiplexer or demultiplexer.

How many light-conducting fibers are joined into this kind of adjustment unit is a question of suitability and depends on the optical design of the multiplexer or demultiplexer. In a demultiplexer, generally all the exit light-conducting fibers are combined into this kind of adjustment unit. It is certainly possible, however, to provide a plurality of exit fiber adjustment units, which can be attached either to a shared coupling face or to separate coupling faces. On the other hand, given a corresponding optical design, it is also possible for the entry light-conducting fibers to be combined into a common adjustment unit along with the exit light-conducting fibers. The foregoing also applies to multiplexers.

For the perforated plate, it is advantageous to use a relatively thin plate of etchable material, because in that case the bores can be etched more simply and with greater accuracy. In an advantageous embodiment, the perforated plate is therefore joined to a reinforcement block, on the side facing away from the supporting block, to make it stronger.

In a particularly advantageous embodiment of the invention, the reinforcement block comprises a U-shaped part, which has a recess for accommodating the light-conducting fibers therein, and a plate-shaped part that is cemented to the surface having the recess; the spaces between the light-conducting fibers and the parts of the reinforcement block are likewise filled in with cement. In this manner, the relatively thin perforated plate becomes the terminal member of a compact and easily manipulated adjustment unit, and so its free surface can be easily machined along with the end faces of the light-conducting fibers, producing a light-conducting fiber array.

In another advantageous embodiment of the invention, the light-conducting fibers are additionally fixed in a second perforated plate of photolithographically etchable material, which is disposed spaced apart from the first perforated plate by a defined distance. This embodiment is particularly favorable if the light-conducting fibers are to be aligned exactly parallel to one another in their orientation, or if the light-conducting fibers are to be arranged in the shape of a fan, so as to attain optimal illumination of the grating (in the case of a multiplexer) or of the light-conducting fibers (in the case of a demultiplexer). In the latter case, the holes on the second perforated plate will be spaced apart somewhat differently from those on the first perforated plate.

In a particularly advantageous embodiment of the invention, an intermediate block of a defined thickness is cemented between the two perforated plates. The intermediate block has a cutout for the light-conducting fibers and is preferably divided in two at this cutout. The adjustment of this intermediate block and the two perforated plates relative to one another can be effected by means of the outer boundary of these parts, by orienting them in exact alignment with one another. In another embodiment, the intermediate block has recesses for two adjusting pins, and when the perforated plates are made they are provided with holes for the adjusting pins, spaced apart by defined distances from the holes for the light-conducting fibers.

In a further advantageous embodiment of the invention, a light-absorbing (black) cement is used for cementing the light-conducting fibers into the perforation mask or masks and for cementing the light-conducting fibers to the parts of the reinforcement block or intermediate block; by this means, there is less cross talk between the individual light-conducting fibers.

In manufacturing a multiplexer or demultiplexer with a transparent supporting block, there is no opportunity for focusing by mechanical adjustment so that the focus or the spectrum can be located precisely on the coupling face. In order that overly close tolerances for the optical components, such as the supporting block and grating, need not be adhered to during manufacture, a further advantageous embodiment of the invention provides that a plate of matched thickness is disposed between the transparent supporting block and the surface of the perforated plate or of the light-conducting fiber array.

BRIEF DESCRIPION OF THE DRAWING

The invention will now be described with reference to the drawing wherein.

Figure 6:
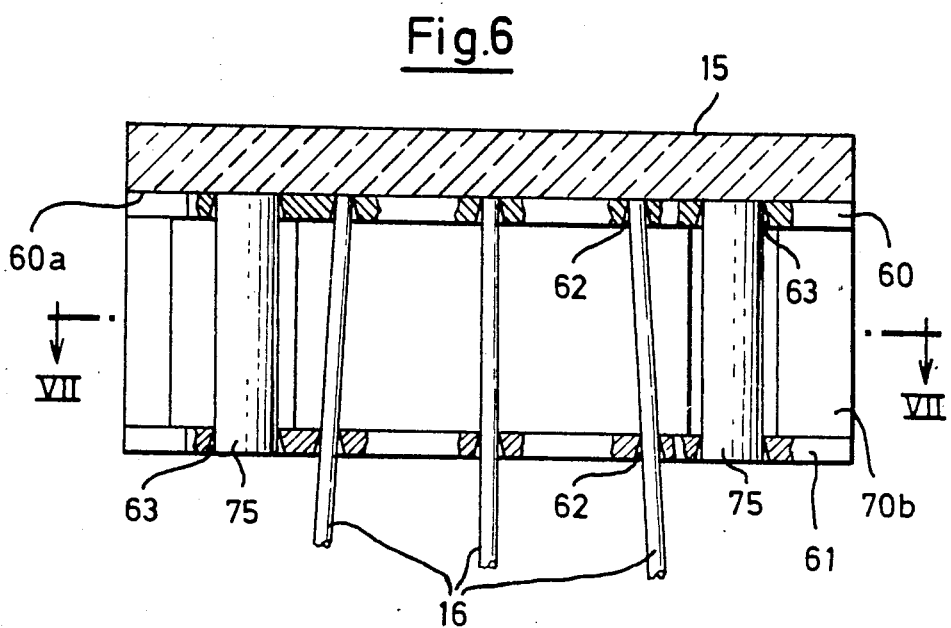
Figure 7:
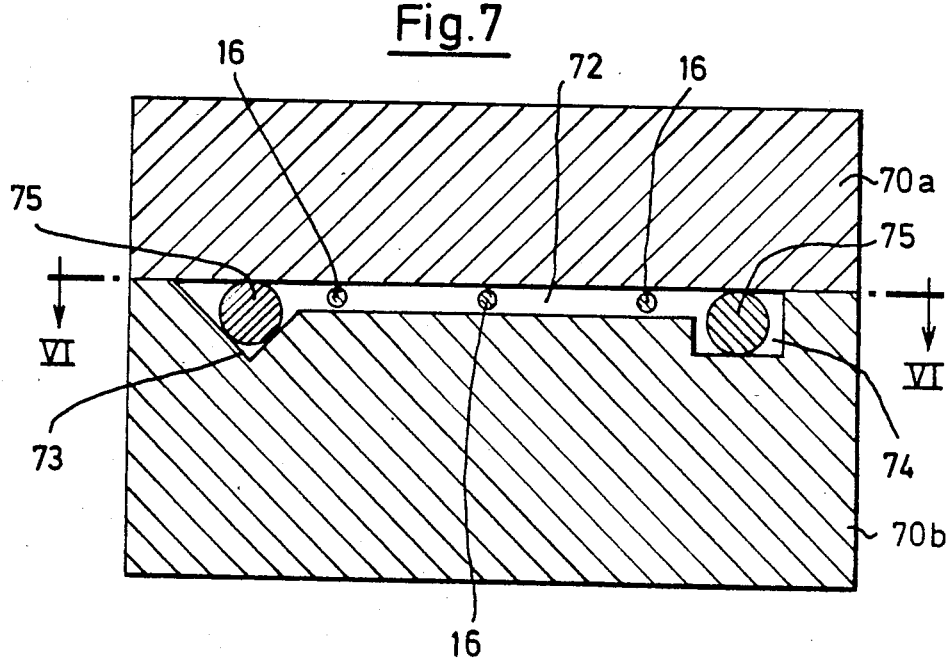

FIG. 6, on a larger scale, shows a multiplexer or demultiplexer according to another embodiment of the invention wherein the light-conducting fibers are coupled in utilizing two perforated plates; and, FIG. 7 is a section taken along the line VII—VII of FIG. 6.

DESCRIPTION OF THE PREFERRED EMBODIMENTS OF THE INVENTION

Figure 1:
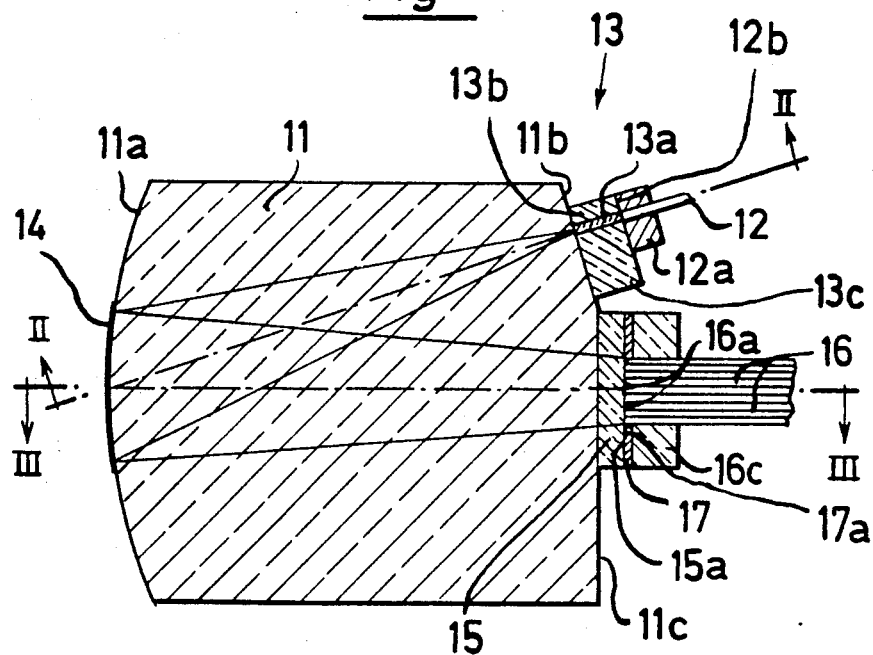
FIG. 1 is a section taken through a multiplexer or demultiplexer according to an embodiment of the invention, the section being in the dispersion plane.
Figure 2:
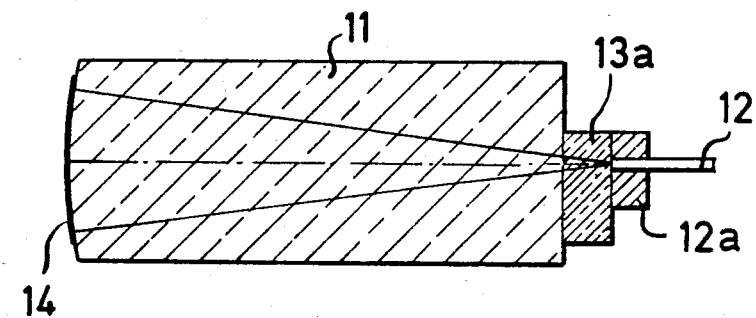
FIG. 2 is a section taken along the line II—II of FIG. 1.
Figure 3:
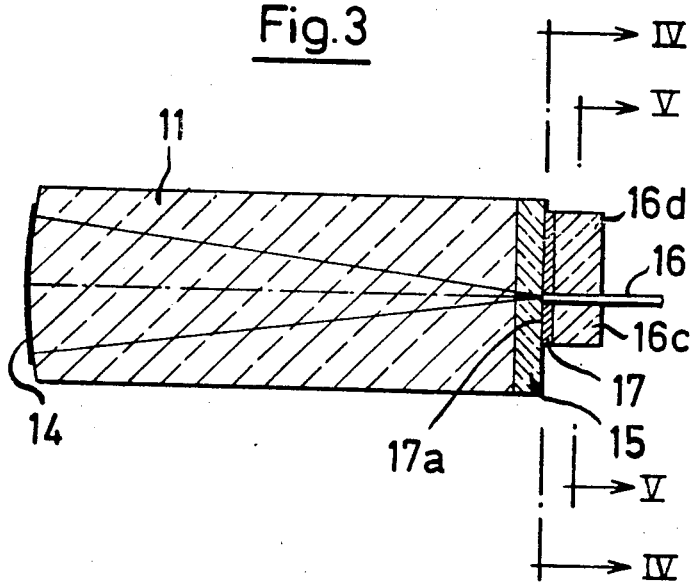
FIG. 3 is a section taken along the line III—III of FIG. 1.

The transparent supporting block 11 is shown in FIGS. 1 to 3 and may be made of BaF4 glass, as an example. The concave grating 14 is copied onto convex face 11a of the supporting block 11 using known techniques. In a multiplexer, the radiation, having various wavelength ranges, that reaches the supporting block 11 from the light-conducting fibers 16 is focused into the entry face of the light-conducting fiber 12 by the concave grating 14. In a demultiplexer, the concave grating 14 spatially divides the radiation, comprising various wavelength ranges or channels, that enters the supporting block 11 from the light-conducting fiber 12 into its individual wavelength ranges, and each wavelength range is guided into one of the light-conducting fibers 16. The ensuing description relates to a demultiplexer, but it is equally applicable, with appropriate modification, to a multiplexer.

The entry light-conducting fiber 12 is cemented into a cylindrical bore of the glass part 12a; the end of the light-conducting fiber 12 is ground down flat and polished along with the surface 12b of this glass part. The surface 12b is cemented onto a laminated waveguide 13, the structure and operation of which have been described in the copending patent application Ser. No. 808,291, filed Dec. 12, 1985, of Reinhold Bittner and entitled "Optical Arrangement having a Concave Mirror or Concave Grating". The laminated waveguide 13 comprises a waveguide layer 13a, having as nearly as possible the same index of refraction as the core of the light-conducting fiber 12. The thickness of this layer 13a is equal to the core diameter of the light-conducting fiber 12, and its length is selected such as to compensate for the astigmatism resulting from the concave grating 14. To enable better handling, the waveguide layer 13a is cemented between two glass parts 13b and 13c having a lower index of refraction. The laminated waveguide 13 is in turn cemented onto the coupling face 11b of the supporting body 11.

Figure 4:
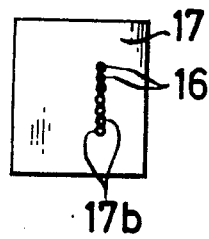
FIG. 4 is a section taken along the line IV—IV of FIG. 3.

Because of the concave grating 14, the spectrum of the radiation entering the demultiplexer via the light-conducting fiber 12 appears in the plane 15a. The front faces 16a of the light-conducting fibers 16 must therefore be disposed in an exactly correct position in the plane 15a to receive the various wavelength ranges. The light-conducting fibers 16, only a few of which are shown in the drawing, are brought into this position by the perforated plate 17, which is shown separately in FIG. 4. The perforated plate 17 is made of a photolithographically etchable material, such as FOTURAN, a product of the Schott company, into which bores 17b for receiving the light-conducting fibers 16 have been etched in the following manner. The exact location of the bores (in particular with respect to one another) can be calculated based on the geometric structure of the demultiplexer and the specifications of the concave grating 14. In accordance with these specifications, a metal mask, for instance, having the exact arrangement of the bores is made, using known techniques. Through this mask, the photosensitive special glass of the perforated plate 17 is exposed to parallel ultraviolet light. An ensuing heat treatment causes crystallization (devitrification) in the exposed areas and through the entire thickness of the plate. In the etching procedure that follows, the crystallized areas are then removed substantially faster than the other areas, producing the bores 17b in the perforated plate 17. The light-conducting fibers 16 are then cemented into these bores, and hence are in exactly the right position with respect to one another.

Figure 5:
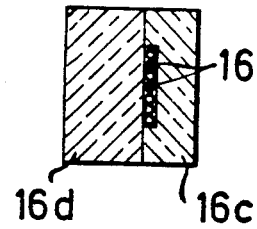
FIG. 5 is a section taken along the line V—V of FIG. 3.

Since the perforated plate is suitably relatively thin, it is advantageous to cement it onto a reinforcement block so as to make it stronger. In the exemplary embodiment shown, the reinforcement block comprises the parts 16c and 16d shown separately in FIG. 5. The part 16c is U-shaped and has a recess which receives the light-conducting fibers 16. The part 16d is plate-like and is cemented onto the surface having the recess and the spaces between the various light-conducting fibers 16 and between the faces of the parts of the reinforcement block are likewise filled up with cement. The perforated plate 17, the two parts 16c and 16d of the reinforcement block and the beginnings of the light-conducting fibers 16 thus embody a compact, easily manipulated adjustment unit.

The free surface 17a of the perforated plate 17 and the end faces 16a of the light-conducting fibers 16 are then ground down and polished together, so that the end faces 16a terminate flush with the surface 17a and form a light-conducting fiber array. In the exemplary embodiment shown, the surface 17a is flat; however, it may also be machined spherically or aspherically using known optical techniques, if that would be more favorable, for instance to correct imaging errors.

In FIGS. 6 and 7, another and particularly advantageous exemplary embodiment for coupling in the light-conducting fibers is shown, in which each light-conducting fiber has its axis optimally oriented toward the concave grating. The same plate 15 as in FIGS. 1 and 3 is shown, which—as will be described later—serves to compensate for focusing differences. Two photolithographically produced perforated plates 60 and 61 are shown as well, in which the bores 62, which are slightly conical because of the above-described manner of their production, are arranged in such a way that each light-conducting fiber 16 is given the correct orientation. In order to simplify the drawing, only the two outer light-conducting fibers and the middle one are shown.

Accurately defined spacing between the two perforated plates 60 and 61 is assured by an intermediate block, which in a particularly favorable embodiment, shown in FIG. 7, comprises the parts 70a and 70b. These two parts form a cutout 72 for the light-conducting fibers 16 and two recesses 73 and 74 for two adjusting pins 75. The perforated plates 60 and 61 also have bores 63 for the adjusting pins 75; these bores have also been produced by the photolithographic etching process, and thus they have an accurately defined and reproducible position relative to the bores 62 for the light-conducting fibers 16.

In the assembly operation, an adjusting pin 75 is first fixed in the recess 73 of the part 70b of the intermediate block with some cement, and the second adjusting pin 75 is placed in the recess 74. Then the perforated plates 60 and 61 are fitted onto the adjusting pins 75 from both sides and cemented to the part 70b. Next, the light-conducting fibers 16 are inserted, the intervening spaces in the slit 72 and the recesses 73 and 74 are filled up with cement, and the upper part 70a of the intermediate block, which has a thickness somewhat less than that of the lower part 70b, is inserted and at least partly cemented to the upper halves of the perforated plates 60 and 61.

Finally, the surface 60a, along with the somewhat protruding ends of the light-conducting fibers 16 and adjusting pins 75, is ground down and polished. In order to prevent contaminating the end faces of the cemented-in light-conducting fibers in this process, the adjusting pins are made of the same or a similar material as the light-conducting fibers, such as glass or quartz glass. It is particularly favorable to use segments of thicker light-conducting fibers as adjusting pins. It is recommended that the adjusting pins be of considerably larger diameter than the light-conducting fibers 16, for the sake of mechanical strength and ease of handling. By using glass or quartz glass for the adjusting pins, mechanical strains in the event of temperature changes are also avoided.

In the event that the photolithographic etching process produces bores having a conical angle smaller than the maximum inclination of the light-conducting fibers relative to the normal of the plate, then a double exposure to light is effected during production, at two different angles from the normal of the plate.

Demultiplexers should exhibit the least possible cross talk, that is, the slightest possible transmission of the signal of one channel to a neighboring channel. Where the light-conducting fibers are attached to the supporting block 11 or to the plate 15, radiation at the edge of the particular wavelength range being used can also enter into the end faces of the fiber cladding. Since the radiation in the cladding is not transmitted—unlike that in the core of the light-conducting fiber—it can leave this cladding and, via the cement and the cladding of the neighboring light-conducting fiber, can enter into the core of this neighboring fiber. By using a light-absorbing (black) cement, instead of a transparent cement, for cementing the light-conducting fibers 16 into the perforated plate or plates 17, 60 and 61 and for cementing the light-conducting fibers 16 to the part 16c and 16d of the reinforcement block or to the parts 70a and 70b of the intermediate block, such cross talk can be avoided.

For producing a demultiplexer, it is advantageous to dispose a plate 15 of a matched thickness between the perforated plate 17 or 60 and the transparent supporting block 11. By means of this plate 15, the tolerances for the supporting block 11 and for the concave grating 14 can be kept within economically viable limits despite the fact that with a compact supporting block 11, it is no longer possible to perform focusing by mechanical adjustment.

In assembling the demultiplexer, first the entry fiber 12 along with the holder element 12a is cemented onto the laminated waveguide 13, which in turn is cemented onto the coupling face 11b of the transparent supporting block 11. Then the distance between the spectrum and the surface 11c of the supporting block 11 is measured optomechanically, which determines the necessary thickness of the plate 15. With individually made demultiplexers, the plate 15 is machined to the correct thickness only after this determination; in mass production, an assortment of suitable plates is kept on hand, and the correct one selected in each case. In principle, the supporting block 11 is made shorter in the corresponding dimension to the that the plate 15 will in each case have an adequate thickness. As is immediately apparent from FIG. 1, the plate 15 also makes it simpler to manufacture the supporting block 11.

Once the plate 15, of appropriately matched thickness, has been cemented onto the perforated plate 17 or 60, the entire unit, including the reinforcement block or intermediate block and light-conducting fibers 16, is placed on the coupling face 11c of the supporting block 11, adjusted and likewise cemented in place. The adjustment may for instance be done such that for the two light-conducting fibers 16 located on the edges, the largest possible signal is produced, for example, when the appropriate wavelength ranges enter via the entry light-conducting fibers 16.

The demultiplexer may be introduced into a suitable housing (not shown), to protect it from mechanical strain and from external light. Instead of the concave grating shown in the exemplary embodiment, the multiplexer may be equipped with a plane grating and a concave mirror.

It is understood that the foregoing description is that of the preferred embodiments of the invention and that various changes and modifications may be made thereto without departing from the spirit and scope of the invention as defined in the appended claims.

What is claimed is:

1. A wavelength multi/demultiplexer comprising:
   a plurality of light-conducting fibers having respective coupling surfaces;
   a transparent supporting block having a diffraction grating and at least one coupling surface for operatively connecting said light-conducting fibers with said supporting block;
   a perforated plate made of photographically etchable material defining a plurality of photographically-etched bores for fixedly accommodating selected ones of said light-conducting fibers therein and having a surface facing toward said coupling surface of said supporting block and extending transversely to said fibers;
   said surface of said perforated plate and the coupling surfaces of the light-conducting fibers mounted in said plate being conjointly processed to define a flush surface; and, said perforated plate and the light-conducting fibers mounted therein being operatively connected to said coupling surface of said supporting block.

2. The wavelength multi/demultiplexer of claim 1, said perforated plate being made of a material selected from the group consisting of etchable glass and silicon.

3. The wavelength multi/demultiplexer of claim 1, said perforated plate having a second surface facing away from said coupling surface of said supporting block, said wavelength multi/demultiplexer comprising reinforcement means joined to said second surface for increasing the stability of said plate.

4. The wavelength multi/demultiplexer of claim 3, said reinforcement means being a composite block including two block parts, one of said block parts having a U-shaped recess formed therein for accommodating said selected ones of said light-conducting fibers and, the other one of said blocks being a plate-like block for covering over said recess and the fibers accommodated therein; and, cement means for fixing said fibers in said recess.

5. The wavelength multi/demultiplexer of claim 4, said selected ones of said light-conducting fibers being cemented into said plate and said composite block with light-absorbing cement.

6. The wavelength multi/demultiplexer of claim 1, comprising a second perforated plate made of a photographically etchable material mounted at a defined spacing from said first-mentioned perforated plate, said second perforated plate having a plurality of bores for fixedly accommodating said selected ones of said light-conducting fibers.

7. The wavelength multi/demultiplexer of claim 6, said bores of said second perforated plate being spaced one from the other at respectively different spacings as the bores of said first perforated plate.

8. The wavelength multi/demultiplexer of claim 1, comprising compensating means for compensating for focusing variation differences between said supporting block and said perforated plate.

9. The wavelength multi/demultiplexer of claim 8, said compensating means being a plate having a predetermined thickness disposed between said perforated plate and said coupling surface of said supporting block.

10. A wavelength multi/demultiplexer comprising:
a plurality of light-conducting fibers having respective coupling surfaces;
a transparent supporting block having a diffraction grating and at least one coupling surface for operatively connecting said light-conducting fibers with said supporting block;
a perforated plate made of a photographically etchable material and defining a plurality of bores for fixedly accommodating selected ones of said light-conducting fibers therein and having a surface facing toward said coupling surface of said supporting block and extending transversely to said fibers;
said surface of said perforated plate and the coupling surfaces of the light-conducting fibers mounted in said plate being conjointly processed to define a flush surface;
said perforated plate and the light-conducting fibers mounted therein being operatively connected to said coupling surface of said supporting block;
a second perforated plate made of a photographically etchable material mounted at a defined spacing from said first-mentioned perforated plate, said second perforated plate having a plurality of bores for fixedly accommodating said selected ones of said light-conducting fibers; and,
an intermediate block having a defined thickness and being cemented between said plates, said intermediate block having a cutout formed therein for accommodating said selected ones of said light-conducting fibers.

11. The wavelength multi/demultiplexer of claim 10, said intermediate block being made up of two block parts defining an interface therebetween, said cutout being disposed in one of said block parts and at said interface.

12. The wavelength multi/demultiplexer of claim 10, said intermediate block having two openings formed therein, each of said plates having two openings at a defined spacing from the bores accommodating said selected ones of said light-conducting fibers, said two openings in each of said plates being in alignment with corresponding ones of said openings in said intermediate block thereby defining two sets of aligned openings, said wavelength multi/demultiplexer comprising two adjusting pins mounted in corresponding ones of said sets of openings.

13. The wavelength multi/demultiplexer of claim 10, said selected ones of said light-conducting fibers being cemented into said plates and said intermediate block with light-absorbing cement.

* * * * *

UNITED STATES PATENT AND TRADEMARK OFFICE
CERTIFICATE OF CORRECTION

PATENT NO. : 4,703,472

DATED : October 27, 1987

INVENTOR(S) : Martin Blumentritt et al

It is certified that error appears in the above-identified patent and that said Letters Patent is hereby corrected as shown below:

On the title page, under "Inventors": delete "Alfred Reüle," and substitute -- Alfred Reule -- therefor.

In column 6, line 25: after "the" first occurrence, please add -- extent --.

Signed and Sealed this

Twenty-second Day of March, 1988

Attest:

DONALD J. QUIGG

*Attesting Officer*  *Commissioner of Patents and Trademarks*